US012547359B2

(12) United States Patent
Austin et al.

(10) Patent No.: US 12,547,359 B2
(45) Date of Patent: Feb. 10, 2026

(54) AUDIO AND VISUAL ENVIRONMENT FOR A PEDESTRIAN

(71) Applicant: Toyota Motor Engineering & Manufacturing North America, Inc., Plano, TX (US)

(72) Inventors: Benjamin Piya Austin, Saline, MI (US); Rohit Gupta, Santa Clara, MI (US); William Patrick Garrett, Plymouth, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/519,184

(22) Filed: Nov. 27, 2023

(65) Prior Publication Data

US 2025/0173102 A1    May 29, 2025

(51) Int. Cl.
| | | |
|---|---|---|
| *G09B 21/00* | (2006.01) | |
| *G06F 3/01* | (2006.01) | |
| *G06F 3/14* | (2006.01) | |
| *G06F 3/16* | (2006.01) | |
| *G09F 9/30* | (2006.01) | |
| *G09F 27/00* | (2006.01) | |
| *G06F 111/18* | (2020.01) | |

(52) U.S. Cl.
CPC ................ *G06F 3/14* (2013.01); *G06F 3/011* (2013.01); *G06F 3/165* (2013.01); *G09F 9/30* (2013.01); *G09F 27/00* (2013.01); *G06F 2111/18* (2020.01); *G06F 2203/011* (2013.01); *G09B 21/00* (2013.01); *G09F 2027/001* (2013.01)

(58) Field of Classification Search
CPC . G06F 3/14; G06F 3/011; G06F 3/165; G06F 2203/011; G09F 9/30; G09F 27/00; G09F 2027/001
See application file for complete search history.

(56) References Cited

U.S. PATENT DOCUMENTS

| | | |
|---|---|---|
| 9,092,309 B2 | 7/2015 | MacNeille et al. |
| 9,589,237 B1 | 3/2017 | Qamar |
| 9,924,271 B2 | 3/2018 | Lai et al. |
| 10,134,059 B2 | 11/2018 | Mishra et al. |
| 10,169,827 B1 | 1/2019 | Paulus et al. |

(Continued)

OTHER PUBLICATIONS

Kätsyri, et al. "Negativity bias in media multitasking: The effects of negative social media messages on attention to television news broadcasts." PloS one 11.5 (2016): e0153712.

(Continued)

*Primary Examiner* — Roy P Rabindranath
(74) *Attorney, Agent, or Firm* — Christopher G. Darrow; Darrow Mustafa PC

(57) ABSTRACT

System, methods, and other embodiments described herein relate to improving an audio and/or visual environment of a pedestrian. In one embodiment, a method includes identifying at least one device in an environment of a pedestrian that produces an output perceivable by the pedestrian, where the output includes at least one of an audio output and a visual output. The method further includes in response to determining that the output satisfies a change threshold, adjusting the output according to a pedestrian preference.

20 Claims, 4 Drawing Sheets

(56) References Cited

U.S. PATENT DOCUMENTS

| | | |
|---|---|---|
| 10,405,786 B2 | 9/2019 | Sahin |
| 10,583,709 B2 | 3/2020 | Chen et al. |
| 11,396,299 B2 | 7/2022 | Papp |
| 2016/0217769 A1* | 7/2016 | Nguyen .................. G09G 5/30 |
| 2019/0243602 A1 | 8/2019 | Smith et al. |
| 2020/0073585 A1* | 3/2020 | Fujitani ................ G06F 3/0659 |
| 2021/0081749 A1* | 3/2021 | Claire .................... G06F 3/005 |
| 2021/0248173 A1 | 8/2021 | Hansen et al. |
| 2021/0352427 A1* | 11/2021 | Itakura ................... G09F 27/00 |
| 2022/0188432 A1 | 6/2022 | Turmel et al. |
| 2023/0156259 A1 | 5/2023 | Depew et al. |
| 2023/0221911 A1* | 7/2023 | Bandameedipalli ...... G06F 3/14 345/156 |
| 2024/0038107 A1* | 2/2024 | Imai ....................... G08G 1/005 |
| 2024/0233201 A1* | 7/2024 | Lin ......................... G06F 3/011 |

OTHER PUBLICATIONS

Brasel et al. "Media multitasking: How visual cues affect switching behavior." Computers in Human Behavior 77 (2017): 258-265.

Segijn et al. "The role of ad sequence and privacy concerns in personalized advertising: An eye-tracking study into synced advertising effects." Journal of Advertising 50.3 (2021): 320-329.

Yakura et al. "An automated system recommending background music to listen to while working." User Modeling and User-Adapted Interaction 32.3 (2022): 355-388.

Chakraborty et al. "Using viewer's facial expression and heart rate for sports video highlights detection." Proceedings of the 5th ACM on International Conference on Multimedia Retrieval. 2015.

* cited by examiner

AUDIO AND VISUAL ENVIRONMENT FOR A PEDESTRIAN

TECHNICAL FIELD

The subject matter described herein relates, in general, to improving an audio and/or visual environment of a pedestrian, and, more particularly, to creating a custom audio and/or visual environment for pedestrians by manipulating audio and/or visual outputs in the environment.

BACKGROUND

Pedestrian environments, such as public streets, sidewalks, etc., often include a variety of displays and audio systems. For example, the displays and audio systems inform pedestrians of safe times to cross a street, warning messages, and advertisements. Due to the large number of displays and audio systems in cities and in busy pedestrian environments, pedestrians may miss important information by their attention being diverted elsewhere. For example, if a pedestrian is too distracted by a display in the environment, the pedestrian may wander into approaching traffic, deviate from their path, or cause traffic delays. Further, pedestrians with noise perception disorders may feel uncomfortable in or avoid busy pedestrian environments, such as downtown areas in cities, altogether. As an example, visuals in pedestrian environments may be too bright, too distracting, or otherwise undesirable depending on the individual. Accordingly, current pedestrian environments do not consider the preferences of pedestrians currently in the environment, leading to pedestrians feeling uncomfortable/unhappy, to pedestrians avoiding an area, and/or to pedestrians encountering unsafe conditions in the environment.

SUMMARY

In one embodiment, example systems and methods relate to a manner of creating a custom audio and visual environment for pedestrians. As previously discussed, current pedestrian environments include displays and audio systems that output visuals and audio regardless of who is present in the environment. Failure to tailor visual and audio outputs can lead to pedestrians avoiding an environment, to pedestrians feeling uncomfortable/unhappy in an environment, and/or to pedestrians facing safety concerns.

Therefore, in one embodiment, a system that improves an audio and/or visual environment for a pedestrian is disclosed. In one aspect, the system is implemented in different forms, such as within infrastructure, vehicles, and user devices within an environment. The system may also be implemented in a cloud-based computing system. In any case, the system is generally configured to control audio and visual outputs of devices (e.g., infrastructure, external vehicle outputs, etc.) within an environment of a pedestrian. The system determines which devices are perceivable by the pedestrian (i.e., which devices produce outputs that the pedestrian can see/hear). For example, the system determines the location of the devices in relation to the pedestrian using various methods, such as direction perception (e.g., via sensors worn by the pedestrian that can detect nearby devices) and location-based services. Further, the system determines the outputs produced by the devices to determine whether the outputs produce an auditory/visual environment that is preferential to the pedestrian.

The system acquires information about the pedestrian in order to determine an auditory and visual environment preferred by the pedestrian. The information may be acquired from a profile associated with the pedestrian. Devices of the pedestrian may passively and/or actively collect data regarding audio and visual preferences of the pedestrian. For example, devices, such as a smartphone, smart TV, smart home system, smart watch, etc. may collect information about how the pedestrian reacts to different audio and visual outputs encountered throughout the day. Audio and visual preferences in the profile can include audio and visual outputs that invoke happiness or other positive feelings in the pedestrian. When the current environment settings do not coincide with the preferences stored in the profile, the system adjusts the outputs of the devices by controlling the visual and audio outputs to invoke positivity in the pedestrian, to maximize pedestrian satisfaction, and/or to invoke other reactions of the pedestrian.

Moreover, where multiple pedestrians are present in the environment, the pedestrians may have different standards for satisfactory audio and visual outputs. Accordingly, the system may acquire and process the preference information about all of the pedestrians to determine a group preference of the pedestrians. The group preference can correspond to environment settings that would invoke positivity and maximize satisfaction among all of the pedestrians. Accordingly, the system can adjust the environment settings to invoke reactions and feelings in the pedestrians as a whole. In this way, the system adjusts and customizes environment settings to satisfy pedestrians in an environment and thereby improves the overall experience of pedestrians who spend time in stimulating environments.

In one embodiment, an immersion system is disclosed. The immersion system includes one or more processors and a memory communicably coupled to the one or more processors. The memory storing instructions that, when executed by the one or more processors, cause the one or more processors to identify at least one device in an environment of a pedestrian that produces an output perceivable by the pedestrian, where the output includes at least one of an audio output and a visual output. The instructions further include instructions to, responsive to determining that the output satisfies a change threshold, adjust the output according to a pedestrian preference.

In one embodiment, a non-transitory computer-readable medium and including instructions that when executed by one or more processors cause the one or more processors to perform one or more functions is disclosed. The instructions include instructions to identify at least one device in an environment of a pedestrian that produces an output perceivable by the pedestrian, where the output includes at least one of an audio output and a visual output. The instructions further include instructions to, responsive to determining that the output satisfies a change threshold, adjust the output according to a pedestrian preference.

In one embodiment, a method is disclosed. In one embodiment, the method includes identifying at least one device in an environment of a pedestrian that produces an output perceivable by the pedestrian, where the output includes at least one of an audio output and a visual output. The method further includes, in response to determining that the output satisfies a change threshold, adjusting the output according to a pedestrian preference.

BRIEF DESCRIPTION OF THE DRAWINGS

The accompanying drawings, which are incorporated in and constitute a part of the specification, illustrate various systems, methods, and other embodiments of the disclosure.

It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
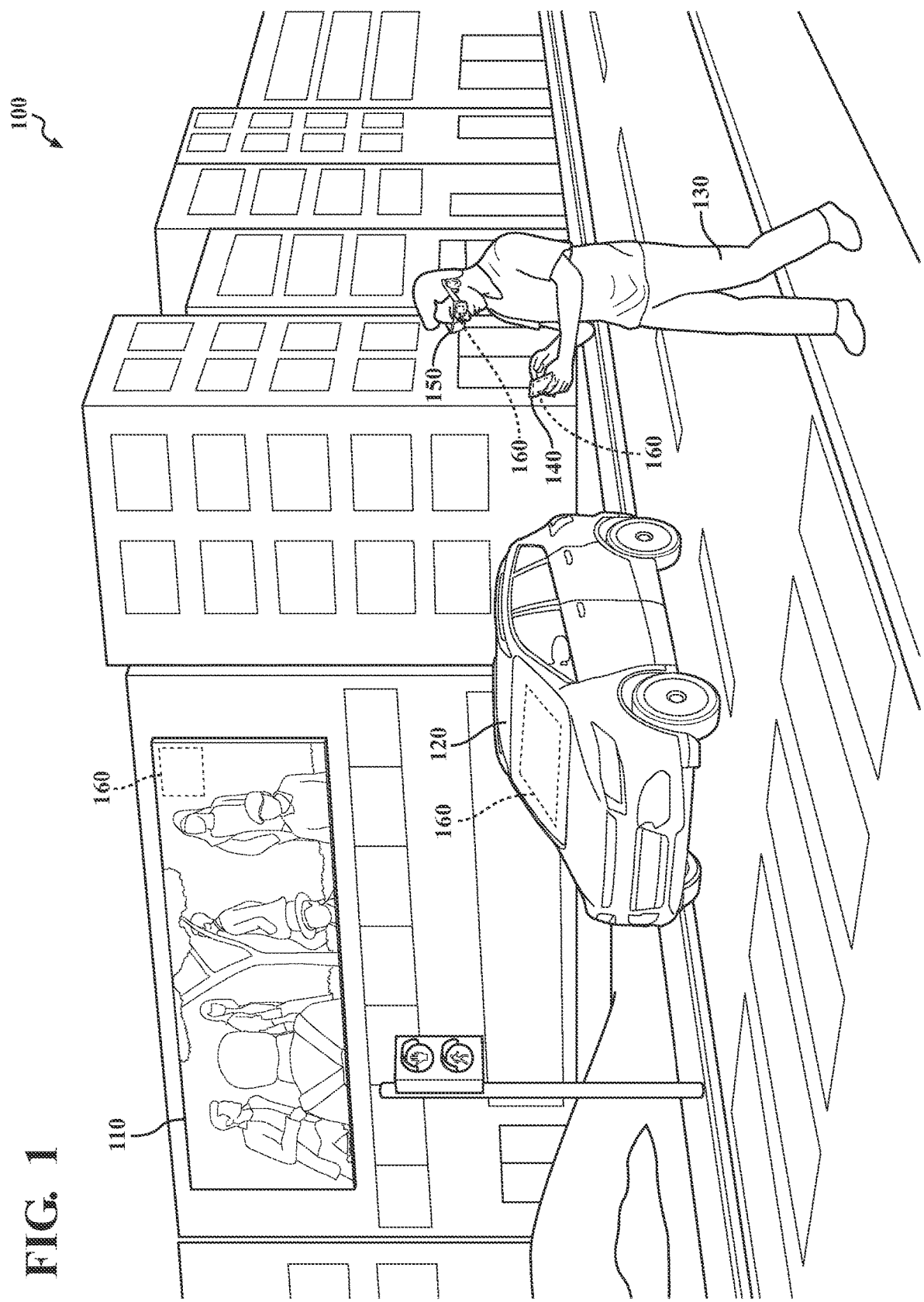
FIG. 1 illustrates one embodiment of an environment within which systems and methods disclosed herein may be implemented.

Systems, methods, and other embodiments associated with improving a pedestrian environment according to pedestrian preferences are disclosed herein. As previously discussed, current pedestrian environments include devices, such as infrastructure and vehicles, that are preconfigured to output visuals and audio that are not preferred by all pedestrians. Because pedestrians typically cannot adjust the visuals/audio of devices in their environment, pedestrians may avoid an environment, feel uncomfortable/unhappy in an environment, and/or face safety concerns.

Therefore, in one embodiment, a system that improves an audio and/or visual environment for a pedestrian is disclosed. In one aspect, the system is implemented in different forms, such as within infrastructure, vehicles, and user devices within an environment. The system may also be implemented in a cloud-based computing system and/or remote server. In any case, the system is generally configured to control audio and visual outputs of devices (e.g., infrastructure, external vehicle outputs, etc.) within an environment of a pedestrian. For example, the system may control the sound frequency and volume of audio outputs and the brightness, color, and flash pattern of visual outputs.

Controlling the audio and visual outputs includes customizing the outputs in a manner that pleases a pedestrian in the environment. To determine which outputs to customize, the system identifies which devices produce outputs that are perceivable by the pedestrian (i.e., which devices produce outputs that the pedestrian can see/hear). The system may determine the location of the devices in relation to the pedestrian using various methods, such as via direct perception. For example, the pedestrian may carry and/or wear a device that includes sensors (e.g., cameras, microphones, etc.) for identifying devices in the environment that produce audio and visual outputs. Further, the system may determine the location using location-based services. As an example, devices in the environment may register with a remote server/network, where registering allows the server/network to receive location data associated with the devices. Additionally, the server/network may include a pedestrian profile that includes information, such as how far the pedestrian is able to see and hear outputs from their current position. Accordingly, the system can determine which devices are within a viewable/audible range of the pedestrian, and thus, which devices may be affecting the overall enjoyment of the pedestrian in the environment. Further, the system determines the outputs produced by the devices to determine whether the outputs produce an auditory/visual environment that is preferential to the pedestrian.

To determine a preferential auditory/visual environment for the pedestrian, the system acquires preferences of the pedestrian from, for example, a profile associated with the pedestrian. The profile develops the preferences of the pedestrian by passively and/or actively collecting data about auditory/visual preferences of pedestrian. The system analyzes the collected data to determine the preferences of the pedestrians by identifying physiological reactions (e.g., changes in heart rate, body movement, eye movement, changes in facial features, etc.) of the pedestrian corresponding to various audio and visual outputs. The physiological reactions are indicative of a mental state of the pedestrian, where the mental state can include mental states associated with the pedestrian feeling positive, happy, stressed, distracted, focused, etc.

In any case, the recordation of physiological reactions can occur both when the pedestrian is in the current environment and when the pedestrian is in an environment external to the current environment (e.g., when the pedestrian is at home, at work, in a vehicle, etc.). Passive data collection includes collecting information associated with a physiological reaction of the pedestrian to audio/visual outputs encountered throughout the day. For example, devices, such as a smartphone, smart TV, smart home system, smart watch, etc., may collect information about how the pedestrian reacts to different audio and visual outputs encountered throughout the day. In addition to passive data collection, the pedestrian information is collected using active data collection methods. To actively collect pedestrian information, devices of the pedestrian can intentionally present the pedestrian with audio/visual outputs to record a physiological reaction of the pedestrian associated with the presented audio/visual outputs. As an example, devices of the pedestrian may output visuals with different colors and luminescence and audio with different frequencies, tones, and volumes to record the reactions of the pedestrian to the various outputs. The devices of the pedestrian record the physiological reactions of the pedestrian and store the acquired reactions in the pedestrian profile.

Audio and visual preferences in the profile can include audio and visual outputs that invoke physiological reactions associated with happiness or other positive feelings in the pedestrian. Additionally, the profile can include audio and visual outputs that invoke stress or a distracted mental state in the pedestrian. When the current environment settings do not coincide with the preferences stored in the profile (i.e., when the settings are associated with audio/visual outputs that cause stress or distraction in the pedestrian), the system adjusts the outputs of the devices by controlling the visual and audio outputs to invoke positivity in the pedestrian, to maximize pedestrian satisfaction, and/or to invoke other reactions of the pedestrian. The profile can further include audio and visual outputs that invoke quick responses to safety critical information in the environment. Quick responses are, in one approach, reactions of the pedestrian that correspond to the pedestrian directing focus/attention to an audible/visual stimuli within a threshold amount of time (e.g., within three seconds or less). Safety critical information includes, for example, the presence of emergency vehicles, car horns localized to the vicinity of the pedestrian, "Do Not Walk" signs, and other safety critical/urgent information relevant to the safety of a pedestrian.

The pedestrian preferences stored in the profile can also include preferences that correspond to differing cognitive states of the pedestrian. For example, when the pedestrian is focused on performing time critical tasks, the pedestrian may prefer environment settings that are neutral and quiet to avoid being distracted. As such, the environment settings can be adjusted according to the cognitive state of the pedestrian. Further, where the pedestrian is in an area with safety risks, the environment settings improve the ability of the pedestrian to react in situations that require pedestrian attention. Accordingly, the information in the pedestrian profile may include audio and visual outputs that have previously grasped the pedestrian's attention. Therefore, when the pedestrian is confronted with a safety condition, such as when a vehicle is rapidly approaching a crosswalk the pedestrian has entered, the system can cause the adjustment of environment settings to output audio and visuals that will invoke an improved reaction time in the pedestrian.

Moreover, where multiple pedestrians are present in the environment, the system may acquire and process the preference information about all of the pedestrians to determine a group preference of the pedestrians. The group preference can correspond to outputs that invoke a physiological reaction indicative of mental states among all of the pedestrians, such as mental states that correspond to happiness and/or relaxation. Accordingly, the system can adjust the environment settings to invoke reactions and feelings in the pedestrians as a whole by adjusting the settings to invoke a collective physiological reaction associated with feelings of positivity.

Instead of adjusting the settings to satisfy the pedestrians as a whole, where pedestrians include pedestrians of differing age demographics, knowledge, and capabilities, the system can prioritize the safety of vulnerable pedestrians over the comfort of the pedestrians as a whole. For example, where elderly pedestrians, pedestrians who are hard of hearing/sight, and/or pedestrians with disabilities are present in the environment, the system adjusts the settings by prioritizing the wants/needs of the vulnerable pedestrians before adjusting the settings to please all of the pedestrians as a whole. Additionally, the system can adjust the environmental settings in different regions of the environment depending on where the pedestrians are located. For example, a pedestrian on a first street corner may prefer to be notified of safety critical information using purple flashing lights while a pedestrian on a second street corner prefers to be notified of safety critical information using red solid lights. As such, the system adjusts the individual regions of the environment according to individual pedestrian preferences. In this way, the system adjusts and customizes environment settings to satisfy pedestrians in an environment and thereby improves the overall experience of pedestrians who spend time in stimulating environments.

Referring to FIG. 1, an example of an environment 100 is illustrated. As used herein, an "environment" is a space in which road users (e.g., pedestrians, cyclists, vehicles, scooters, etc.) can travel and that includes one or more devices capable of outputting audio and visuals perceivable by pedestrians. In one or more implementations, the environment 100 may be a public space that can include infrastructure 110, a vehicle 120, and devices carried by a pedestrian 130, where the devices include a user device 140 and a wearable augmented reality (AR) device 150. While arrangements will be described herein with respect to an environment that includes the infrastructure 110, the vehicle 120, the pedestrian 130 and the pedestrian devices, it will be understood that embodiments may include additional infrastructure, vehicles, pedestrians, pedestrian devices, and/or other road users and devices. Further, in one or more arrangements, the environment may not be a public space and may not include the infrastructure 110 and/or the vehicle 120.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In one approach, the infrastructure 110, the vehicle 120, the user device 140, and the wearable AR device 150 are configured to produce audio and/or visual outputs. Audio outputs include, for example, outputs of varying sound frequencies, volumes, tones, noises, and so on while visual outputs include outputs of varying colors, brightness, flash patterns, content, and so on. In one configuration, the infrastructure 110, the vehicle 120, the user device 140, and the wearable AR device 150 are perceivable by the pedestrian 130 (i.e., within a viewable and/or audible range of the pedestrian 130). As an example, the infrastructure 110 may include a display or screen and speakers that are visible/audible by the pedestrian 130, the vehicle 120 may include external displays/speakers that produce outputs perceivable by the pedestrian 130, the user device 140 may include screens/displays and speakers/headphones that produce outputs perceivable by the pedestrian 130, and the AR device is, for example, smart glasses, a smart helmet, a virtual reality (VR) headset, etc., that includes a screen/display and speakers that produce outputs perceivable by the pedestrian 130.

In one embodiment, the environment 100 further includes an immersion system 160 that adjusts the outputs of the devices in the environment 100. As will be discussed in greater detail subsequently, the immersion system 160, in various embodiments, is implemented partially within the devices of the environment 100, such as the infrastructure 110, the vehicle 120, the user device 140, and/or the AR device 150, and as a cloud-based service. For example, in one approach, functionality associated with at least one module of the immersion system 160 is implemented within the infrastructure 110, the vehicle 120, the user device 140, and/or the AR device 150, while further functionality is implemented within a cloud-based computing system.

In any case, in response to determining that the outputs of the devices in the environment 100 do not coincide with preferences of the pedestrian 130, the immersion system 160 adjusts the outputs of the devices to match the preferences of the pedestrian 130. The pedestrian preferences may be stored in a pedestrian profile accessible by the immersion system 160. As an example, in response to determining that the infrastructure 110 outputs audio/visuals that causes stress in the pedestrian 130, the immersion system 160 adjusts the output of the infrastructure 110 to output audio/visuals that cause feelings of happiness and/or relaxation in the pedestrian 130. It should be understood that, in one or more arrangements, the immersion system 160 can additionally adjust the output of the other devices in the environment 100 that are perceivable by the pedestrian 130 to achieve an output that causes physiological reactions indicative of mental states associated with happiness, relaxation, and/or attentiveness in the pedestrian 130. In this way, the immersion system 160 improves an audio and/or visual environment of a pedestrian.

Figure 2:
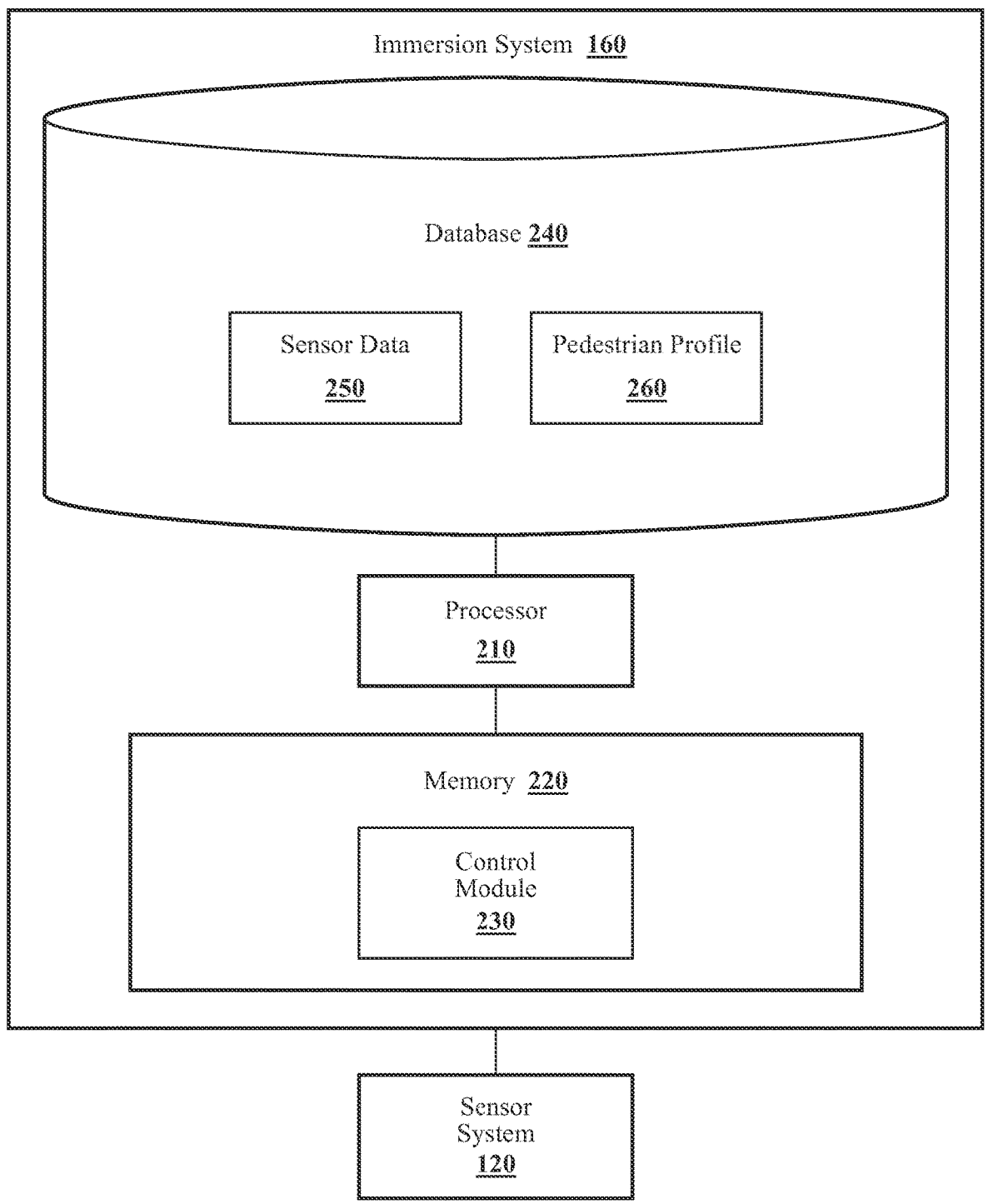
FIG. 2 illustrates one embodiment of an immersion system that is associated with providing a preferential environment for pedestrians.

With reference to FIG. 2, one embodiment of the immersion system 160 of FIG. 1 is further illustrated. The immersion system 160 is shown as including a processor 210. Accordingly, the processor 210 may be a part of the immersion system 160 or the immersion system 160 may access the processor 210 through a data bus or another communication path. In one embodiment, the immersion system 160 includes a memory 220 that stores a control module 230. The memory 220 is a random-access memory (RAM), read-only memory (ROM), a hard-disk drive, a flash memory, or other suitable memory for storing the control module 230. The control module 230 is, for example, computer-readable instructions that when executed by the processor 210 cause the processor 210 to perform the various functions disclosed herein.

Figure 3:
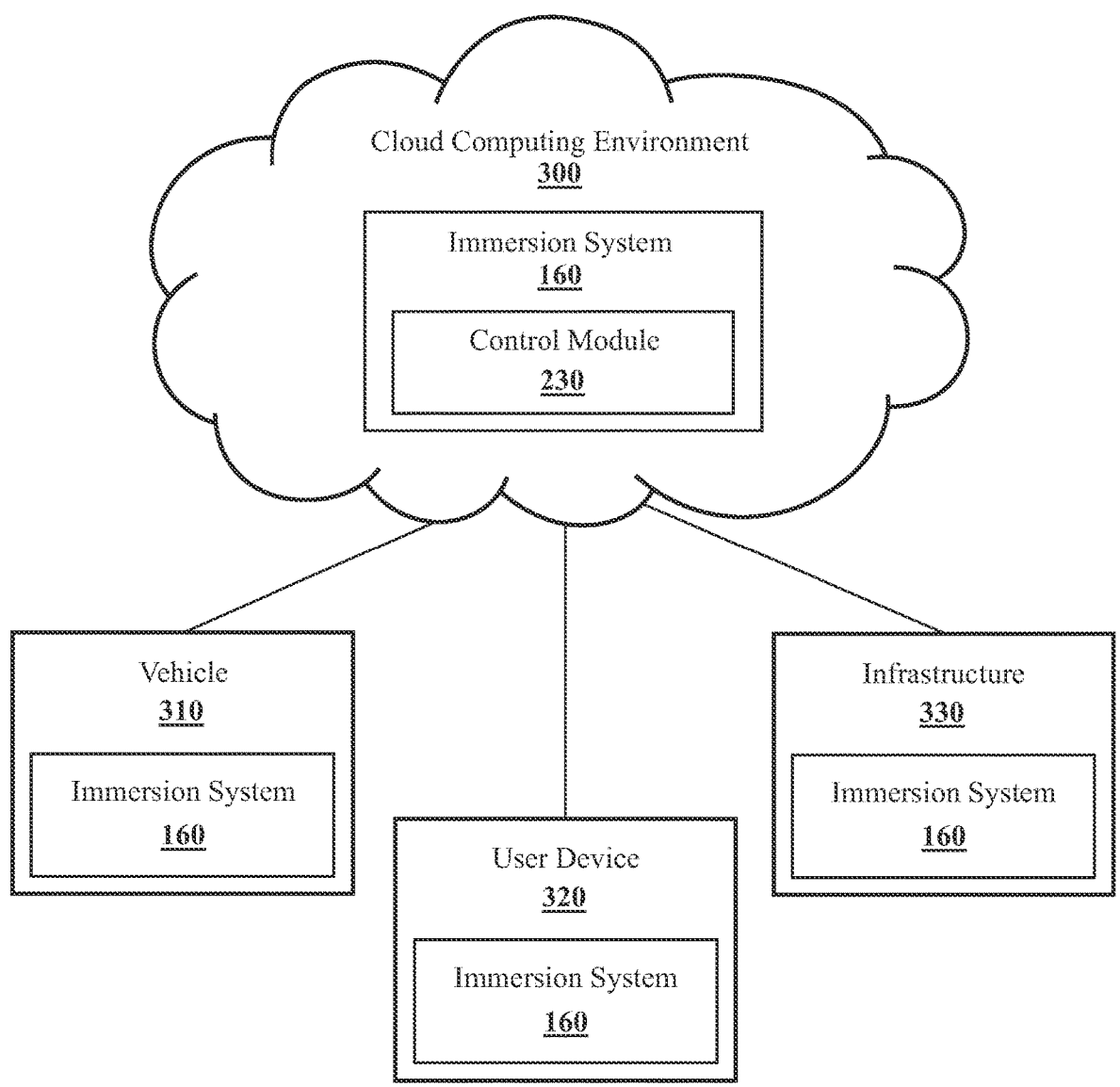
FIG. 3 illustrates one embodiment of the immersion system of FIG. 2 in a cloud-computing environment.

The immersion system 160 as illustrated in FIG. 2 is generally an abstracted form of the immersion system 160 as may be implemented between the devices in the environment 100 and a cloud-computing environment. FIG. 3 illustrates one example of a cloud-computing environment 300 that may be implemented along with the immersion system 160. As illustrated in FIG. 3, the immersion system 160 is embodied at least in part within the cloud-computing environment 300 and also within a vehicle 310, a user device 320, and infrastructure 330. That is, the cloud-computing environment 300, the vehicle 310, the user device 320, and the infrastructure 330 each include the control module 230 or at least a portion thereof. For example, the vehicle, device, and infrastructure can include a client instance of the immersion system 160 that is, in one or more configurations, a lightweight version, including functionality for acquiring data, determining pedestrian preferences, and determining audio/visual outputs that conform to pedestrian preferences is included in the client instance of the immersion system 160. Thus, the control module 230 is, in one or more arrangements, generally implemented within both aspects of the immersion system 160 in order to provide for handling of the electronic data that includes pedestrian preferences.

In one approach, the vehicle 310, the user device 320, and the infrastructure 330 represent reporting devices that are equipped with sensors to identify physiological reactions and preferences of pedestrians. That is, the vehicle 310 is, for example, autonomous, semi-autonomous, equipped with advanced driving assistance systems (ADAS), or another arrangement that generally includes sensors capable of acquiring pedestrian physiological reactions. The noted user device may be a smart television (TV), a smart home system, a smart security system, a wearable device (e.g., a smart watch, augmented reality (AR) device, virtual reality (VR) device), a mobile phone, or other device that generally includes sensors for acquiring pedestrian physiological reactions. The infrastructure 330 may be a building, billboard, stoplight, or other environmental structure equipped with sensors for acquiring pedestrian physiological reactions. Additionally, while one vehicle, one user device, and one infrastructure are illustrated, it should be appreciated that as a general matter the number of vehicles, user devices, and infrastructure are not limited but instead includes any number of vehicles/user devices/infrastructure that are equipped in the noted manner and provide reports about the preferences for audio/visual settings of pedestrians.

In one embodiment, the vehicle 310, the user device 320, and the infrastructure 330 generally represent devices that output audio and/or visuals in the environment of a pedestrian. That is, the vehicle 310, the user device 320, and the infrastructure 330 generally include interfaces (e.g., displays, speakers, etc.) for outputting audio and/or visuals in a manner that is perceivable by pedestrians in the environment. In one arrangement, the vehicle 310, the user device 320, and the infrastructure 330 register with a remote server that is part of the cloud-computing environment 300. In response to registering with the remote server, the vehicle 310, the user device 320, and the infrastructure 330 can share data relating to the vehicle 310, the user device 320, and the infrastructure 330, such as the location of the vehicle 310, the user device 320, and the infrastructure 330, the audio/visual outputs of the vehicle 310, the user device 320, and the infrastructure 330, and so on with the remote server. Additionally, while one vehicle, one user device, and one infrastructure element are illustrated, it should be appreciated that as a general matter, the number of vehicles, user devices, and infrastructure elements are not limited but instead includes any number of vehicles/user devices/infrastructure that are equipped in the noted manner and provide reports about the location and outputs of the devices in an environment.

With continued reference to FIG. 2, the control module 230 generally includes instructions that function to control the processor 210 to receive data inputs from one or more sensors that acquire physiological reactions associated with the pedestrian 130. Physiological reactions are responses to visual/audible stimuli encountered by the pedestrian, where the physiological reactions may be manifested as changes in the heart rate of the pedestrian, facial expressions of the pedestrian, skin arousal/skin conductivity of the pedestrian, brain activity of the pedestrian, eye/head movements of the pedestrian, etc. The sensors are, for example, sensors integrated into devices of the pedestrian 130, such as a vehicle, a smartphone, wearable devices (e.g., a smart watch, AR device, etc.), a smart TV, a security system, smart home system (e.g., Google Nest®, Amazon Alexa®)). As provided for herein, the control module 230, in one embodiment, acquires sensor data 250 that includes at least camera images. In further arrangements, the control module 230 acquires the sensor data 250 from further sensors such as an electroencephalogram (EEG) sensor, a near infrared spectroscopy sensor (NIRS sensor), a galvanic skin response (GSR) sensor, a heart rate sensor, and other sensors as may be suitable for identifying physiological reactions of the pedestrian 130.

Additionally, the sensor data 250 can include data associated with a cognitive state of the pedestrian when the physiological reactions of the pedestrian are acquired. The cognitive state of the pedestrian is associated with the current ability of the pedestrian to focus, which may be discerned based on the cognitive load of the user when the physiological reactions are acquired. A high cognitive load is, for example, associated with the pedestrian engaging in multiple tasks, mentally exhaustive tasks, and so on. A low cognitive load is associated with the pedestrian engaging in a task that requires little to no effort or mental strain on behalf of the pedestrian. The sensor data 250 associated with the cognitive state of the pedestrian can include body movements, behavior, facial expressions, brain activity, and/or an environment of the pedestrian as indicated by image/video data, data associated with inputs received by devices of the pedestrian, data relating to brain activity of the pedestrian (e.g., EEG and NIRS measurements), and so on.

Accordingly, the control module 230, in one embodiment, controls the respective sensors to provide the data inputs in the form of the sensor data 250. Additionally, while the control module 230 is discussed as controlling the various sensors to provide the sensor data 250, in one or more embodiments, the control module 230 can employ other techniques to acquire the sensor data 250 that are either active or passive. For example, the control module 230 may passively sniff the sensor data 250 from a stream of electronic information provided by the various sensors to further components within the devices. Moreover, the control module 230 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

Moreover, in one embodiment, the immersion system 160 includes a data store 240. In one embodiment, the data store 240 is a database. The database is, in one embodiment, an electronic data structure stored in the memory 220 or another data store and that is configured with routines that can be executed by the processor 210 for analyzing stored data, providing stored data, organizing stored data, and so on. Thus, in one embodiment, the data store 240 stores data used by the control module 230 in executing various functions. In one embodiment, the data store 240 stores the sensor data 250, a pedestrian profile 260, and other information used by the control module 230 in performing the noted functions.

The pedestrian profile 260 includes, in one configuration, baseline physiological data associated with the pedestrian 130. The baseline physiological data may include a resting heart rate of the pedestrian 130, a baseline skin conductivity of the pedestrian 130 when the pedestrian 130 is in a relaxed/resting state, baseline brainwave activity/brain blood flow of the pedestrian 130 during periods of rest/relaxation, a resting facial expression of the pedestrian 130, and baseline heart rate, skin conductivity, brain activity, and facial expressions of the pedestrian 130 during various cognitive loads experienced by the pedestrian 130.

In one or more arrangements, the pedestrian profile 260 additionally stores audio and visual environment setting preferences of the pedestrian 130. In one embodiment, the profile stores general preferences of the pedestrian 130 and further stores preferences of the pedestrian 130 that correspond to a plurality of cognitive states associated with the pedestrian 130. For example, the pedestrian profile 260 may include default preferential audio/visual outputs as well as preferred audio/visual outputs corresponding to the pedestrian 130 having a high cognitive load, low cognitive load, average cognitive load, etc.

Further, in one configuration, the pedestrian profile 260 stores data associated with the eyesight and hearing capabilities of the pedestrian 130. For example, the pedestrian profile 260 stores the eyesight of the pedestrian 130 (e.g., whether the pedestrian 130 is near-sighted, far-sighted, has 20/20 vision, how far away the pedestrian 130 can see visual outputs clearly, etc.) and the hearing capability of the pedestrian 130 (e.g., what sound frequencies, volume levels, tones, etc., the pedestrian 130 is able to hear). In this way, the control module 230 can, in one embodiment, determine outputs in the environment 100 that are perceivable by the pedestrian 130.

Moreover, in one embodiment, the pedestrian profile 260 stores data associated with characteristics about the pedestrian 130. The characteristics include, for example, the age, physical capabilities, presence of disabilities, etc., of the pedestrian 130. Accordingly, in one embodiment, the control module 230 determines whether the pedestrian 130 is vulnerable. In one arrangement, the control module 230 determines that the pedestrian 130 is a vulnerable pedestrian when the age of the pedestrian 130 is above a certain age (e.g., above the age of 70), when the pedestrian 130 is hard of hearing/sight, and/or when the pedestrian 130 is physically disabled (e.g., the pedestrian 130 uses a wheelchair, walker, etc.).

The control module 230, in one embodiment, is further configured to perform additional tasks beyond controlling the respective sensors to acquire and provide the sensor data 250. For example, the control module 230 includes instructions that cause the processor 210 to process the sensor data 250 to determine a pedestrian preference that includes an auditory preference and a visual preference. In one arrangement, the control module 230 determines the pedestrian preference by determining audio and/or visual outputs that invoke physiological reactions in the pedestrian 130. Responsive to determining the preferences of the pedestrian 130, the control module 230, in one approach, records and stores the pedestrian preferences in the pedestrian profile 260. As previously discussed, the physiological reactions can include changes in heart rate of the pedestrian 130, changes in skin arousal/conductivity, changes in facial expressions, and/or changes in eye/head/body movements of the pedestrian 130. The physiological reactions are, in one embodiment, indicative of a mental state (e.g., a happy state, a sad state, an angry state, an attentive state, a distracted state, a stressed state, etc.) of the pedestrian 130. In one approach, the control module 230 determines a mental state associated with audio/visual outputs experienced by/output to the pedestrian 130 by comparing a current physiological reaction of the pedestrian 130 to the baseline physiological data that is stored in the pedestrian profile 260.

Acquired heart rate data can indicate a mental state of the pedestrian 130 in relation to a visual/audible output. For example, a heart rate that is elevated compared to the resting heart rate of the pedestrian 130 (e.g., elevated by a threshold amount, such as 10 beats per minute (bpm) or 10%) may indicate mental states associated with happiness or stress while a decreased heart rate (e.g., decreased by a threshold amount, such as 10 bpm or 10%) may indicate mental states associated with a relaxed mental state. As another example, the low frequency (LF) to high frequency (HF) ratio of heart rate variability (HRV) can indicate mental states of the pedestrian 130. If the LF/HF ratio of HRV is low (e.g., 20-30), then the pedestrian 130 is likely in a calm or relaxed mental state. In contrast, when the LF/HF ratio of HRV is high (e.g., 30-40), then the pedestrian 130 is likely stressed. Increased skin arousal/skin conductivity (e.g., an increased of 5%, 0.1 micro Siemens (μS), etc.) in comparison to the baseline skin arousal/skin conductivity of the pedestrian 130 may indicate feelings of happiness, attentiveness, stress, etc., while decreased skin arousal/skin conductivity (e.g., a decrease of 5%, 0.1 micro Siemens (μS), etc.) may indicate relaxation and comfort.

Additionally, physical movements and expressions, as indicated by the sensor data 250, can inform the control module 230 of the mental state of the pedestrian 130. For example, eye/head/body movements can indicate a response time associated with the pedestrian 130 experiencing audio/visual outputs. Further, changes in facial expressions, as indicated by camera/video data, can indicate the mental state of the pedestrian 130. In one approach, the control module 230 uses a machine learning algorithm embedded within the control module 230, such as a convolutional neural network (CNN), to perform feature recognition over the sensor data 250 associated with the physical movements and facial expressions of the pedestrian 130. Of course, in further aspects, the control module 230 may employ different machine learning algorithms or implements different approaches for performing the associated functions, which can include deep convolutional encoder-decoder architectures, or another suitable approach that identifies expressions and body movements represented in the image/video data. Whichever particular approach the control module 230 implements, the control module 230 provides an output identifying the body movements and facial expressions represented in the sensor data 250. In this way, the control module 230 identifies characteristics about the pedestrian 130, such as the mental state and response time of the pedestrian 130 from the sensor data 250.

In any case, the control module 230 correlates identified physiological reactions with pedestrian preferences. In one embodiment, the control module 230 determines that the preferences of the pedestrian 130 correspond to physiological reactions indicative of happy and relaxed mental states. Further, in one approach, the control module 230 determines the pedestrian preferences according to differing cognitive states of the pedestrian 130 when the physiological reactions are acquired. The control module 230 may determine the cognitive state of the pedestrian 130 according to the brain activity of the pedestrian 130, which can be in the form of EEG or NIRS sensor data. For example, depending on which regions of the brain are emitting brain waves (i.e., based on the EEG data) or which regions of the brain are experiencing increased levels of blood flow (i.e., based on the NIRS data), the control module 230 determines whether the pedestrian 130 is engaged in another mentally intensive task. For example, if the pedestrian is experiencing a high cognitive load (e.g., the pedestrian is multi-tasking, performing a mentally exhaustive task, etc.) when a physiological reaction associated with the pedestrian being happy is acquired, the control module 230 determines that the positive physiological reaction corresponds to a pedestrian preference when the pedestrian is experiencing a high cognitive load.

In one configuration, the control module 230 determines the cognitive load of the pedestrian 130 based on the environment of the pedestrian 130. For example, if the pedestrian 130 is in a stimulating/loud environment (e.g., in a public space) when exposed to the visual/audible stimuli, the control module 230 determines that the cognitive load of the pedestrian 130 is high. On the other hand, if the pedestrian 130 is in a non-stimulating, quiet environment, the control module 230 determines that the cognitive load of the pedestrian is low. Additionally, the control module 230 considers the behavior of the pedestrian 130 in identifying the cognitive load of the environment. For example, if the pedestrian is multi-tasking, conversing with someone, or performing a mentally intensive task (e.g., driving, taking an assessment, etc.) when experiencing the audible/visual stimuli, then the control module 230 determines that the pedestrian 130 has a high cognitive load. Conversely, if the pedestrian 130 is in a neutral state (e.g., not talking with anyone, not performing any mentally exhaustive tasks) when exposed to audible/visual stimuli, the control module 230 determines that the pedestrian 130 has a low cognitive load.

In addition to determining pedestrian preferences according to physiological reactions that invoke mental states associated with happiness and relaxation, the control module 230, in one arrangement, determines a pedestrian preference that corresponds to outputs that invoke quick responses to safety critical information in the pedestrian. Quick responses are, in one approach, reactions of the pedestrian 130 that correspond to the pedestrian 130 directing focus/attention to an audible/visual stimuli within a threshold amount of time (e.g., within three seconds or less). Physiological reactions that indicate reaction times include eye/head movements of the pedestrian 130, changes in heart rate and HRV, changes in skin conductivity, changes in brain activity, and so on. The control module 230, in one embodiment, determines the pedestrian preference by determining physiological reactions that indicate fast reaction times (i.e., physiological reactions that correspond to the pedestrian 130 directing attention towards a visual/audio output within the threshold amount of time) of the pedestrian 130 when experiencing different visual/audio stimuli.

In addition to acquiring and processing the pedestrian data to determine a pedestrian preference, the control module 230, in one approach, identifies at least one device in the environment 100 of the pedestrian 130 that produces an output (i.e., an audio or visual output) perceivable by the pedestrian 130. In one approach, the control module 230 identifies the device by, for example, receiving location data (e.g., GPS data) associated with the device from the remote server of the cloud-computing environment 300. Further, in one arrangement, the control module 230 determines the output of the device based, at least in part, on the data shared by the device with the remote server.

To determine whether the output conforms to the pedestrian preference, the control module 230, in one embodiment, determines whether the output satisfies a change threshold that is based, at least in part, on a difference between the output and the pedestrian preference. In one approach, the control module 230 determines that the output satisfies the change threshold when the output causes a physiological reaction indicative of a stressed state and/or distracted mental state in the pedestrian 130. Conversely, in one approach, the control module 230 determines that the output does not satisfy the change threshold when the output causes a physiological reaction indicative of a happy and/or relaxed mental state in the pedestrian 130. In any case, responsive to the control module 230 determining that the output satisfies the change threshold, the control module 230 adjusts the output according to the pedestrian preference. In this way, the immersion system 160 improves a pedestrian environment according to pedestrian preferences.

Figure 4:
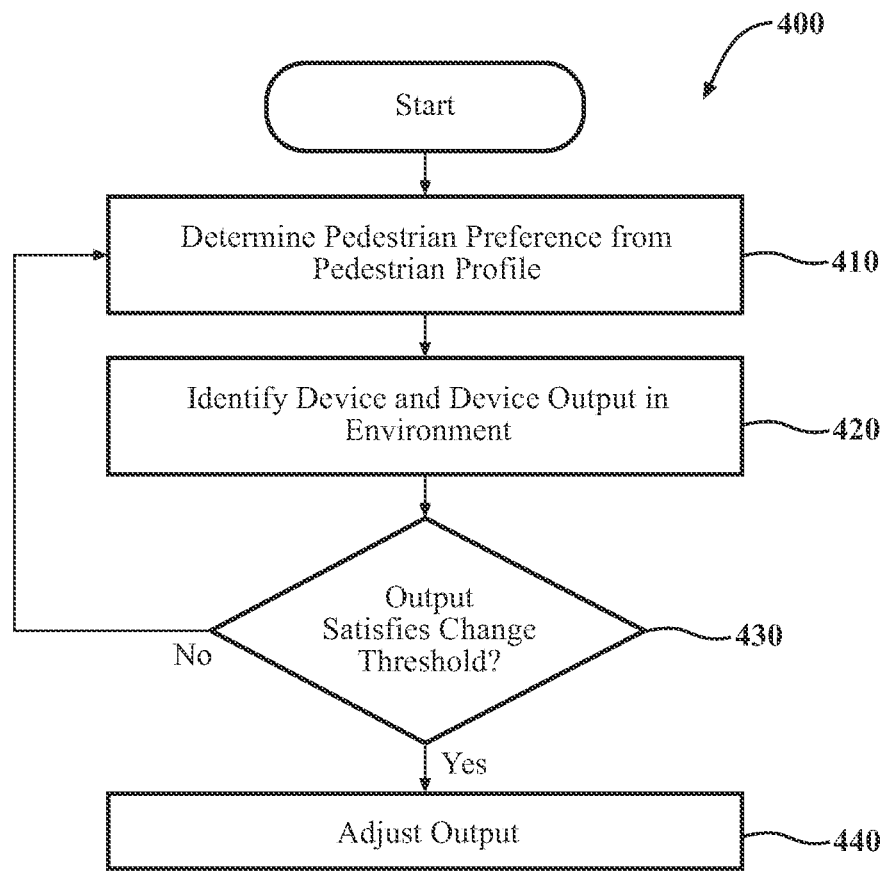
FIG. 4 illustrates one embodiment of a method that is associated with improving an audio and/or visual environment of a pedestrian according to pedestrian preferences.

Additional aspects of improving a pedestrian environment will be discussed in relation to FIG. 4. FIG. 4 illustrates a flowchart of a method 400 that is associated with improving audio/visual outputs presented to a pedestrian in an environment according to preferences of the pedestrian. Method 400 will be discussed from the perspective of the immersion system 160 of FIGS. 1, and 2. While method 400 is discussed in combination with the immersion system 160, it should be appreciated that the method 400 is not limited to being implemented within the immersion system 160 but is instead one example of a system that may implement the method 400.

At 410, the control module 230 determines the pedestrian preference of the pedestrian 130 in the environment 100 from the pedestrian profile 260. For example, in one approach, the control module 230 accesses the pedestrian profile 260 and identifies the audio and/or visual outputs that invoke physiological reactions associated with happy, relaxed, and/or attentive mental states of the pedestrian 130. Further, in one embodiment, the control module 230 identifies the audio and/or visual outputs that invoke physiological reactions associated with happy and/or relaxed mental states of the pedestrian 130 according to different cognitive states of the pedestrian 130.

In one approach, where multiple pedestrians are present in the environment 100, the control module 230 determines a group preference for the pedestrians. In one approach, the group preference corresponds to the environmental outputs that invoke a collective physiological reaction indicative of mental states of the pedestrians. The collective physiological reaction is, in one arrangement, associated with the pedestrians of the environment 100 experiencing a relaxed and/or happy mental state. In one embodiment, the control module 230 determines the collective physiological reaction by analyzing the pedestrian profile 260 of each pedestrian to identify audio/visual outputs that make each individual pedestrian happy and/or relaxed. In one approach, the control module 230 determines the group preference by identifying the audio/visual outputs of the environment 100 that would be preferred by a majority of the pedestrians in the environment 100. For example, if three of the pedestrians prefer blue ambient lighting and volume output at seventy dB, and one pedestrian prefers red ambient lighting and volume output at fifty dB, the control module 230 determines that the group preference corresponds to blue ambient lighting and volume output at seventy dB.

In one embodiment, the control module 230 determines the group preference by determining a weighted average that corresponds to the audio/visual preferences of the group. The control module 230, in one approach, determines the weighted average by first determining the audio/visual preferences of each individual pedestrian. Subsequently, the control module 230 determines characteristics about the pedestrians, such as whether any of the pedestrians is a vulnerable pedestrian, in an emotionally unstable state, and so on. Thereafter, the control module 230, in one arrangement, calculates the weighted average by giving the highest weight to the preferences of a vulnerable pedestrian in the environment 100 (e.g., a pedestrian who is elderly, an infant, disabled, hard of hearing/sight, etc.) and the next highest weight to the preferences of emotionally unstable/unhappy (e.g., stressed, angry, sad, etc.) pedestrians. As an example, if a vulnerable pedestrian prefers red ambient lighting and sounds output at a volume of sixty dB while three other pedestrians prefers yellow ambient lighting and sounds output at a volume of eighty dB, the control module 230 determines that the group preference corresponds to orange ambient lighting with more red than yellow tones and sound output at a volume of 75 dB. It should be understood that the weights can be adjusted according to the needs of the environment 100 and the pedestrians. For example, in one or more arrangements, a higher weight can be given to emotionally unstable pedestrians.

At 420, the control module 230 identifies at least one device in the environment 100 of the pedestrian 130. As previously discussed, the device is any device that produces outputs that are perceivable by the pedestrian 130, such as infrastructure (e.g., a building, billboard, light post, stoplight, etc.), vehicle, and/or user device (e.g., a smartphone, AR device, VR device, etc.). In one approach, the control module 230 identifies the device by acquiring location data (e.g., GPS data) associated with the device from a remote server, such as a remote server that is integrated into the cloud-computing environment 300. In one embodiment, the control module 230 identifies the device by processing sensor data (e.g., image/video data) acquired by a device of the pedestrian 130 to identify and extract features that correspond to a device in the environment 100 of the pedestrian 130.

Responsive to identifying the device, the control module 230, in one arrangement, determines the output of the device. In one approach, the control module 230 determines the output of the device by acquiring the output from the remote server of the cloud-computing environment 300. For example, as previously discussed, devices can share data associated with audio and visuals currently output by the devices, such as the sound frequency, volume, and tone of the audio and the color, brightness, and flash pattern of the visuals. In one embodiment, the control module 230 determines the output of the device by processing sensor data (e.g., image/video data, microphone data, etc.) acquired by a device of the pedestrian 130 to identify and extract features that correspond to outputs of a device in the environment 100 of the pedestrian 130. Further, in one approach, the control module 230 determines whether the output of a device is outputting safety critical and/or urgent information. Safety critical/urgent information includes, for example, audio/visuals produced by emergency vehicles (e.g., ambulances, firetrucks, police cars, etc.), audio/visuals directed towards drawing the attention of the pedestrian 130 (e.g., a car horn, a message for the pedestrian 130, etc.), directional outputs (e.g., "do not cross" signs, countdowns for safe pedestrian crossing, etc.), and so on. In one arrangement, the control module 230 similarly determines the output of a plurality of devices in the environment 100.

Further, in one approach, the control module 230 determines an effective output range of the device in the environment 100. The effective output range is, in one embodiment, the visual/auditory range of the device. In one arrangement, the control module 230 determines the effective visual range by identifying the brightness of the device at the source of the visual output of the device as well as the size of the screen/display that produces the visual output. For example, if the device includes a four feet by four feet screen outputting a brightness of two hundred lumens (lms), the control module 230 may determine that the effective visual range is twenty feet from the device while the control module 230 determines that a device that includes a ten inch by ten inch screen outputting a brightness of thirty lms has an effective visual range of two feet. Similarly, the control module 230, in one arrangement, determines the effective auditory range of the device by identifying the sound frequency and volume of the device at the source of the auditory output of the device. For example, the control module 230 may determine that a device that outputs a sound at a volume of fifty decibels (dBs) has an effective range of ten feet while a device that outputs a sound at a volume of twenty dBs has an effective range of five feet.

Moreover, in one embodiment, the control module 230 adjusts the effective visual/auditory range of a device based on environmental conditions. Environmental conditions include, for example, weather conditions (e.g., rain, snow, wind, etc.), environmental noise (e.g., traffic, pedestrian conversation, infrastructure, etc.). In one approach, the control module 230 determines that the effective visual range of a device is reduced when the weather conditions correspond to rain, sunshine, and/or snow due to these conditions occluding visual outputs and/or when the environmental conditions otherwise affect the visual output of the device. For example, a visual output on a cloudy day has a larger effective visual range than the same visual output on a sunny day. In one configuration, the control module 230 determines that the effective auditory range of a device is reduced when the weather conditions correspond to rain and/or wind due to the noise associated with these weather conditions, when the environmental noise is above a threshold (e.g., above five dBs, ten dBs, etc.), and/or when the environmental conditions otherwise affect the auditory output of the device. As an example, an auditory output on a windy day with traffic noise corresponding to twenty dBs has a smaller effective visual range than the same auditory output on a day with no wind and with traffic noise corresponding to five dBs.

In addition to determining the output of the device(s), in one embodiment, the control module 230 determines the distance between the device(s) and the pedestrian 130. In one approach, the control module 230 determines the distance between the pedestrian 130 and the device(s) by processing location data associated with the pedestrian 130 and the device(s). As previously discussed, devices may register with a remote server that stores and/or tracks the location of the devices in the environment 100. Further, the pedestrian 130 may register a pedestrian device that monitors the location of the pedestrian 130 in the environment 100 with the remote server. Accordingly, in one approach, the control module 230 determines the distance between the pedestrian 130 and a device by analyzing the location data.

At 430, responsive to identifying the device, device output, and device location, the control module 230 determines whether an output of the device satisfies a change threshold that is based, at least in part, on a difference between the output of the device and the pedestrian preference. In one approach, the control module 230 similarly determines the output of a plurality of devices in the environment 100 to determine whether the collective output satisfies the change threshold. In any case, the control module 230 determines whether the device satisfies the change threshold by, in one embodiment, initially determining whether the distance between the device and the pedestrian 130 satisfies a proximity threshold that is based, at least in part, on a distance from the device to the pedestrian 130.

In one approach, the control module 230 determines that the device satisfies the proximity threshold when the device and/or outputs of the device are within a viewable and/or audible range of the pedestrian 130. In one arrangement, the control module 230 determines that the device and/or outputs are within a viewable and/or audible range of the pedestrian 130 according to the hearing and eyesight data stored in the pedestrian profile 260. For example, in one approach, the control module 230 determines that a device is within a viewable range of the pedestrian 130 if the device is emitting visuals at one hundred lumens (lms) from the perspective of the pedestrian 130 and the pedestrian profile 260 stores information about the eyesight of the pedestrian 130 indicating that the pedestrian 130 can see visuals clearly at a level of fifty lms or higher. As another example, the control module 230 determines that an audio output is within an audible range of the pedestrian 130 if the audio output is perceived by the pedestrian at a volume of seventy decibels (dBs) and if the pedestrian profile 260 indicates that the pedestrian 130 can hear any volume at a volume level of thirty dBs or higher.

In one embodiment, the control module 230 determines that the device satisfies the proximity threshold by analyzing a difference in a distance between a device location and a pedestrian location. In one configuration, responsive to acquiring the device location and the pedestrian location from the remote server, the control module 230 determines whether the distance between the devices satisfies the proximity threshold. The proximity threshold is, for example, a distance between the pedestrian 130 and the device that results in outputs of the device being perceivable by the pedestrian 130 (e.g., ten feet, twenty feet, etc.). As an example, if the proximity threshold is ten feet, and the device is six feet from the pedestrian 130, the distance between the device and the pedestrian 130 satisfies the proximity threshold.

Further, in one embodiment, where multiple pedestrians are in the environment 100, the control module 230 determines whether the device satisfies a group proximity threshold that is based, at least in part, on a distance between the device and each pedestrian of the group of pedestrians. As previously discussed, control module 230 determines the distance between the device and each pedestrian by analyzing the location data of the device and each pedestrian. The group proximity threshold is, for example, a distance between the group of pedestrians and the device that results in the output of the device being perceivable by each pedestrian in the group of pedestrians (e.g., ten feet, twenty feet, etc.). For example, if the group proximity threshold is ten feet, and the device is eight feet from each pedestrian in the group of pedestrians, the distance satisfies the group proximity threshold.

With continued reference to 430, in any case, responsive to the control module 230 determining that the device satisfies the proximity/group proximity threshold, thus rendering the device and/or outputs of the device perceivable by the pedestrian 130, the control module 230 determines whether the output of the device(s) satisfies the change threshold. The control module 230, in one embodiment, determines that the output satisfies the change threshold when the output causes a physiological reaction indicative of a stressed and/or distracted mental state. In one approach, the difference between the outputs and pedestrian preference satisfies the change threshold when the environmental outputs cause a collective physiological reaction indicative of a stressed and/or distracted mental state of the group of pedestrians in the environment 100.

Further, in one arrangement, the control module 230 determines that the outputs satisfy the change threshold when the output does not invoke a state of attentiveness/focus (i.e., a fast reaction time) in the pedestrian 130. In one embodiment, if devices in the environment produce outputs that provide safety critical information in a manner that does not invoke a fast reaction in the pedestrian 130 (e.g., a reaction of three seconds or less), the outputs satisfy the change threshold. As an example, if instructions (e.g., directional instructions to cross the street, warnings, etc.) of the infrastructure 110 are preset to output red visual instructions and a beep at 300 Hz/80 dB but the pedestrian 130, on average, responds to blue visual instructions and a chime at 440 Hz/60 dB five seconds faster than the preset outputs of the infrastructure 110, the control module 230 determines that the difference satisfies the change threshold.

In one arrangement, the control module 230 determines that a difference between the output and pedestrian preference satisfy the change threshold when the difference is perceivable by the pedestrian 130. For example, the control module 230, in one approach determines that a difference between audio settings and pedestrian preferences satisfies the change threshold when the difference between the audio settings and pedestrian preferences differs by a perceivable amount, such as by more than five dBs or other predefined volumes that are perceivable by the pedestrian 130. In one approach, the perceivable difference is preset by or learned for the pedestrian 130. Accordingly, if the difference between the audible settings and the pedestrian preferences is small (e.g., less than five dBs), then the difference does not satisfy the change threshold as the difference represents a tolerable difference between the audible settings and pedestrian preferences. In one embodiment, the control module 230 analyzes individual aspects about the audible settings to determine which aspects of the audible settings satisfy the change threshold. For example, the control module 230 may determine that the difference between the noise level and the pedestrian preferences satisfies the change threshold while the difference between the sound frequency and the pedestrian preferences does not satisfy the change threshold.

In one embodiment, visual settings and pedestrian preference satisfies the change threshold when the visual settings are a different color, different brightness, and/or different flash pattern than what is preferred by the pedestrian 130. In one approach, the difference between the visual settings and pedestrian preferences satisfy the change threshold when the visual settings output a flash pattern that differs by at least twenty Hz (or other change in frequency that is noticeable to the pedestrian 130) from the pedestrian preference, when the visual outputs output a brightness that differs by at least ten 1 m from the pedestrian preference, when the visual outputs output a color that is a noticeably different shade than what is preferred by the pedestrian 130 (e.g., red versus blue, green versus blue, etc.), and/or when the visuals differ by other perceivable threshold amounts. In one embodiment, the perceivable visual differences are preset by or learned for the pedestrian 130. As such, when the difference between the visual settings and the pedestrian preferences is slight (e.g., less than twenty Hz difference in flash patterns, less than a ten 1 m change in brightness, a minor deviation of color (e.g., a different shade of blue)), the difference does not satisfy the change threshold as the difference is likely unnoticeable to the pedestrian. In one embodiment, the control module 230 analyzes individual aspects about the visual output to determine which aspects of the visual output satisfy the change threshold. For example, the control module 230 may determine that the difference between the color and the pedestrian preferences satisfies the change threshold while the difference between the flash rate and the pedestrian preferences does not satisfy the change threshold. In any case when the output satisfies the change threshold, the control module 230 adjusts the output as discussed at 440. Otherwise, the control module 230 continues to monitor the outputs of devices in the environment 100 of the pedestrian 130 as discussed at 420.

At 440, responsive to determining that the output satisfies the change threshold, the control module 230, in one embodiment, controls the device(s) to adjust the output according to the pedestrian preference. For example, the control module 230 controls the device(s) to adjust the output by adjusting the auditory and visual outputs of the device(s) in the environment 100 to match the auditory and visual preferences of the pedestrian 130. The control module 230, in one embodiment, controls a plurality of devices to individually adjust outputs of the plurality of devices (e.g., the infrastructure 110, the vehicle 120, the user device 140, and the AR device 150) according to the pedestrian preference. In one approach, the control module 230 adjusts the output of a device in the environment 100 by communicating an adjustment for the output of the device from the remote server over an established communication link between the device and server to cause the device to adapt the output. In one arrangement, the control module 230 controls the device to adjust the output according to the cognitive state of the pedestrian 130. Further, in one approach, where there is a group of pedestrians in the environment 100, the control module 230 controls the devices to adjust the output by adjusting the auditory and visual output of the devices in the environment 100 to match the group preference of the pedestrians.

In one embodiment, the control module 230 controls the device(s) to adjusts the output in a manner that prioritizes safety over happiness/relaxation. For example, in one arrangement, the control module 230 adjusts the output to invoke a physiological reaction in the pedestrian 130 that is a response to safety information, such as instructions from the device, where the physiological reaction corresponds to the pedestrian 130 hearing/seeing the instructions, and where the instructions include a safety warning (e.g., warning not to cross a street, warning about a potential collision, warning from an emergency vehicle, etc.). As an example, when the infrastructure 110 and/or vehicle 120 present a safety warning about a potential collision, the control module 230 controls the infrastructure 110/vehicle 120 to output the safety warning according to what would allow the pedestrian 130 to respond the fastest and/or that would allow the pedestrian 130 to achieve a heightened sense of focus.

Further, in one approach, the control module 230 controls the device(s) to adjust the output to prioritize safety by adjusting the output according to preferences of a vulnerable pedestrian in the environment 100. In one embodiment, the control module 230 prioritizes the safety of the vulnerable pedestrian by controlling the device(s) to adjust the output to conform to the preferences of the vulnerable pedestrian rather than a group of pedestrians in the environment 100. For example, although a group of pedestrians prefers green safety warnings, because a vulnerable pedestrian prefers pink, flashing warnings, the control module 230 controls the device(s) to adjust the output in the environment 100 to output pink, flashing warnings to assist the vulnerable pedestrian.

Additionally, in one arrangement, rather than controlling the device(s) to collectively adjust the output of the environment 100, where multiple pedestrians are present, the control module 230 controls the device(s) to adjust the outputs of devices in individual regions of the environment 100 to match the pedestrian preference of the pedestrians in individual regions of the environment 100. For example, if a first pedestrian on a first street corner prefers red ambient lighting, a second pedestrian on a second street corner prefers blue ambient lighting, and the current environmental outputs produce green ambient lighting, the control module 230 controls the devices to output red ambient lighting in the region surrounding the first pedestrian and blue ambient lighting in the region surrounding the second pedestrian. As another example, if the first pedestrian and the second pedestrian are both wearing AR devices and/or headphones, the control module 230 controls each AR device/pair of headphones to adjust audio/visual outputs so that the individual pedestrians experience different audio/visual outputs while not affecting any other pedestrian, vehicle, or road user in the environment 100. In this way, the immersion system 160 improves the safety and mood of pedestrians by customizing settings of the environment according to pedestrian preferences.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An immersion system comprising:
one or more processors; and
a memory communicably coupled to the one or more processors and storing instructions that, when executed by the one or more processors, cause the one or more processors to:
identify one device in an environment of a pedestrian that produces an output perceivable by the pedestrian, wherein the output includes at least one of an audio output and a visual output, wherein the device is a vertically-mounted sign; and
responsive to determining that the output satisfies a change threshold that is based, at least in part, on a pedestrian location and a pedestrian preference, adjust the output according to the pedestrian preference indicating limitations of visual perceptions and limitations of audio perceptions preferred by the pedestrian associated with physiological conditions for viewing and hearing the output.

2. The immersion system of claim 1,
wherein the instructions to determine that the output satisfies the change threshold include instructions to determine that the device satisfies a proximity threshold that is based, at least in part, on a distance to the pedestrian,
wherein the instructions to determine that the device satisfies the proximity threshold includes instructions to determine that the device is within a viewable range of the pedestrian, and
wherein the at least one device is remote from the pedestrian and perceivable by a group of pedestrians including the pedestrian.

3. The immersion system of claim 2, wherein the instructions to determine whether the device satisfies the proximity threshold include instructions to determine a device location of the device in relation to the pedestrian by analyzing a difference in a distance between the device location and the pedestrian location.

4. The immersion system of claim 1, wherein the instructions to adjust the output include instructions to adjust the output to invoke a physiological reaction in the pedestrian that is a response to instructions from the device, and
wherein the instructions to adjust the output include instructions to adjust at least a volume of the output and a brightness of the output.

5. The immersion system of claim 1, wherein the instructions to adjust the output include instructions to:
create a communication link between the device and a remote server to identify the output of the device at the remote server; and
communicate an adjustment for the output of the device from the remote server over the communication link to cause the device to adapt the output.

6. The immersion system of claim 1,
wherein the physiological conditions indicate one or more of an age, vision abilities, and hearing abilities of the pedestrian.

7. The immersion system of claim 1, wherein the instructions further include instructions to determine the pedestrian preference, wherein the instructions to determine the pedestrian preference include instructions to determine a group preference for a group of pedestrians in the environment,
wherein the instructions to adjust the output include instructions to adjust the output according to the group preference, and
wherein the instructions to determine that the output satisfies the change threshold includes instructions to determine that the device satisfies a group proximity threshold that is based, at least in part, on a distance to each pedestrian of the group of pedestrians.

8. The immersion system of claim 1, wherein the instructions further include instructions to identify a vulnerable pedestrian among a group of pedestrians in the environment, wherein the vulnerable pedestrian is at least one of an elderly pedestrian, a disabled pedestrian, a hearing-impaired pedestrian, and a visually-impaired pedestrian,
wherein the instructions to determine the pedestrian preference include instructions to determine a vulnerable pedestrian preference for the vulnerable pedestrian, and
wherein the instructions to adjust the output include instructions to adjust the output according to the vulnerable pedestrian preference for perception by the group of pedestrians.

9. A non-transitory computer-readable medium including instructions that when executed by one or more processors cause the one or more processors to:
identify at least one device in an environment of a pedestrian that produces an output perceivable by the pedestrian, wherein the output includes at least one of an audio output and a visual output, wherein the device is a vertically-mounted sign; and
responsive to determining that the output satisfies a change threshold that is based, at least in part, on a location of the pedestrian and a pedestrian preference, adjust the output according to the pedestrian preference indicating limitations of visual perceptions and limitations of audio perceptions preferred by the pedestrian associated with physiological conditions for viewing and hearing the output.

10. The non-transitory computer-readable medium of claim 9, wherein the instructions to determine that the output satisfies the change threshold include instructions to determine that the device satisfies a proximity threshold that is based, at least in part, on a distance to the pedestrian,
wherein the instructions to determine that the device satisfies the proximity threshold includes instructions to determine that the device is within a viewable range of the pedestrian.

11. The non-transitory computer-readable medium of claim 9, wherein the instructions to adjust the output include instructions to:
create a communication link between the device and a remote server to identify the output of the device at the remote server; and
communicate an adjustment for the output of the device from the remote server over the communication link to cause the device to adapt the output.

12. The non-transitory computer-readable medium of claim 9, wherein the output is produced by a plurality of devices in the environment, and wherein the instructions to adjust the output include instructions to adjust individual outputs of the plurality of devices according to the pedestrian preference.

13. The non-transitory computer-readable medium of claim 9, wherein the instructions further include instructions to determine the pedestrian preference, wherein the instructions to determine the pedestrian preference include instructions to determine a group preference for a group of pedestrians in the environment,
wherein the instructions to adjust the output include instructions to adjust the output according to the group preference, and
wherein the instructions to determine that the output satisfies the change threshold includes instructions to determine that the device satisfies a group proximity threshold that is based, at least in part, on a distance to each pedestrian of the group of pedestrians.

14. A method, comprising:
identifying at least one device in an environment of a pedestrian that produces an output perceivable by the pedestrian, wherein the output includes at least one of an audio output and a visual output, wherein the device is a vertically-mounted sign; and
in response to determining that the output satisfies a change threshold that is based, at least in part, on a pedestrian location and a pedestrian preference, adjusting the output according to the pedestrian preference indicating limitations of visual perceptions and limitations of audio perceptions preferred by the pedestrian associated with physiological conditions for viewing and hearing the output.

15. The method of claim 14, wherein determining that the output satisfies the change threshold includes determining that the device satisfies a proximity threshold that is based, at least in part, on a distance to the pedestrian, wherein determining that the device satisfies the proximity threshold includes determining that the device is within a viewable range of the pedestrian, and wherein the at least one device is remote from the pedestrian and perceivable by a group of pedestrians including the pedestrian.

16. The method of claim 15, wherein determining whether the device satisfies the proximity threshold includes determining a device location of the device in relation to the pedestrian by analyzing a difference in a distance between the device location and the pedestrian location.

17. The method of claim 14, wherein adjusting the output includes adjusting the output to invoke a physiological reaction in the pedestrian that is a response to instructions from the device.

18. The method of claim 14, wherein adjusting the output includes:

creating a communication link between the device and a remote server to identify the output of the device at the remote server; and communicating an adjustment for the output of the device from the remote server over the communication link to cause the device to adapt the output.

19. The method of claim 14, wherein the output is produced by a plurality of devices in the environment, and wherein adjusting the output includes adjusting individual outputs of the plurality of devices according to the pedestrian preference.

20. The method of claim 14, further comprising:

determining the pedestrian preference, wherein determining the pedestrian preference includes determining a group preference for a group of pedestrians in the environment, wherein, adjusting the output includes adjusting the output according to the group preference, and wherein determining that the output satisfies the change threshold includes determining that the device satisfies a group proximity threshold that is based, at least in part, on a distance to each pedestrian of the group of pedestrians.

* * * * *